Jan. 13, 1970  H. HÄUSSLER  3,488,953
CONTROL APPARATUS FOR FLUID OPERATED VEHICLES
Filed Dec. 7, 1967  2 Sheets-Sheet 1
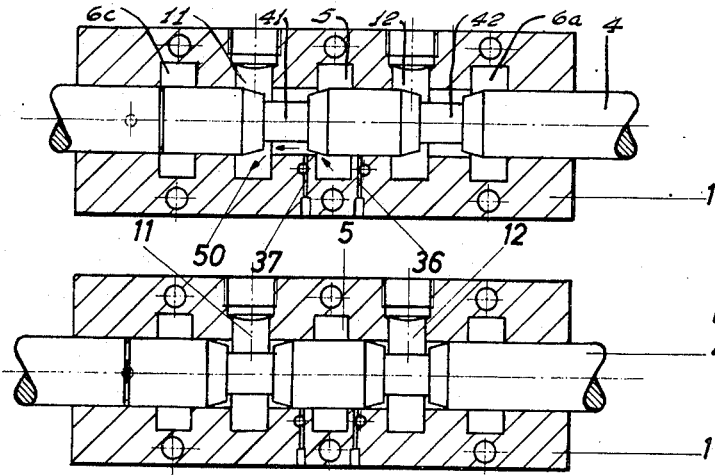
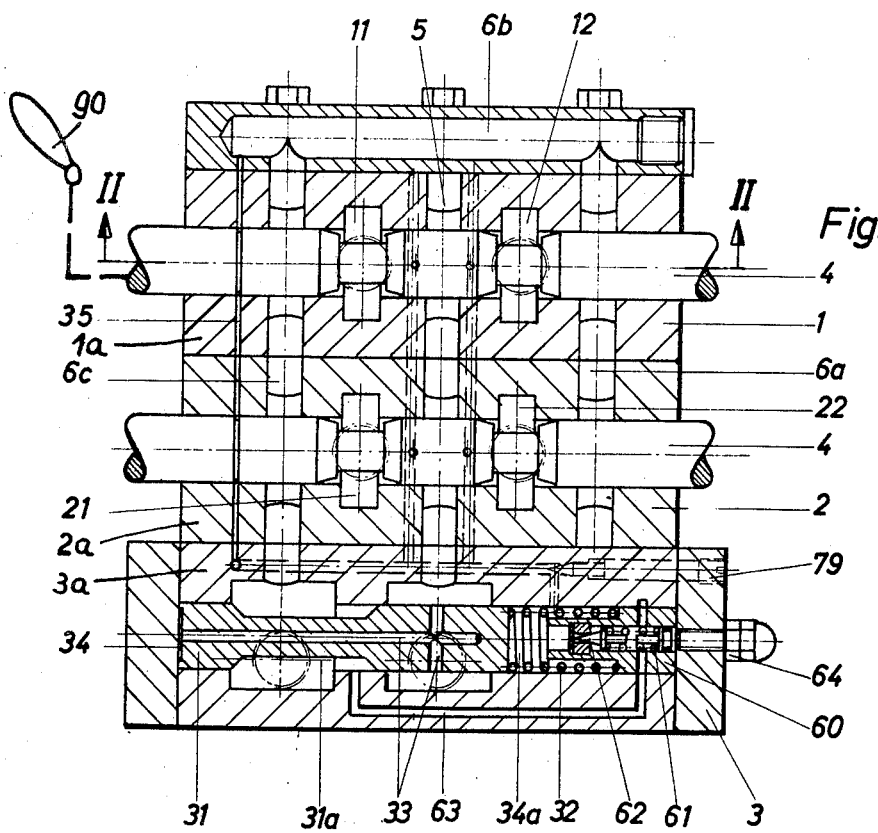
INVENTOR
Hubert Häussler
BY Jacobi & Davidson
ATTORNEY

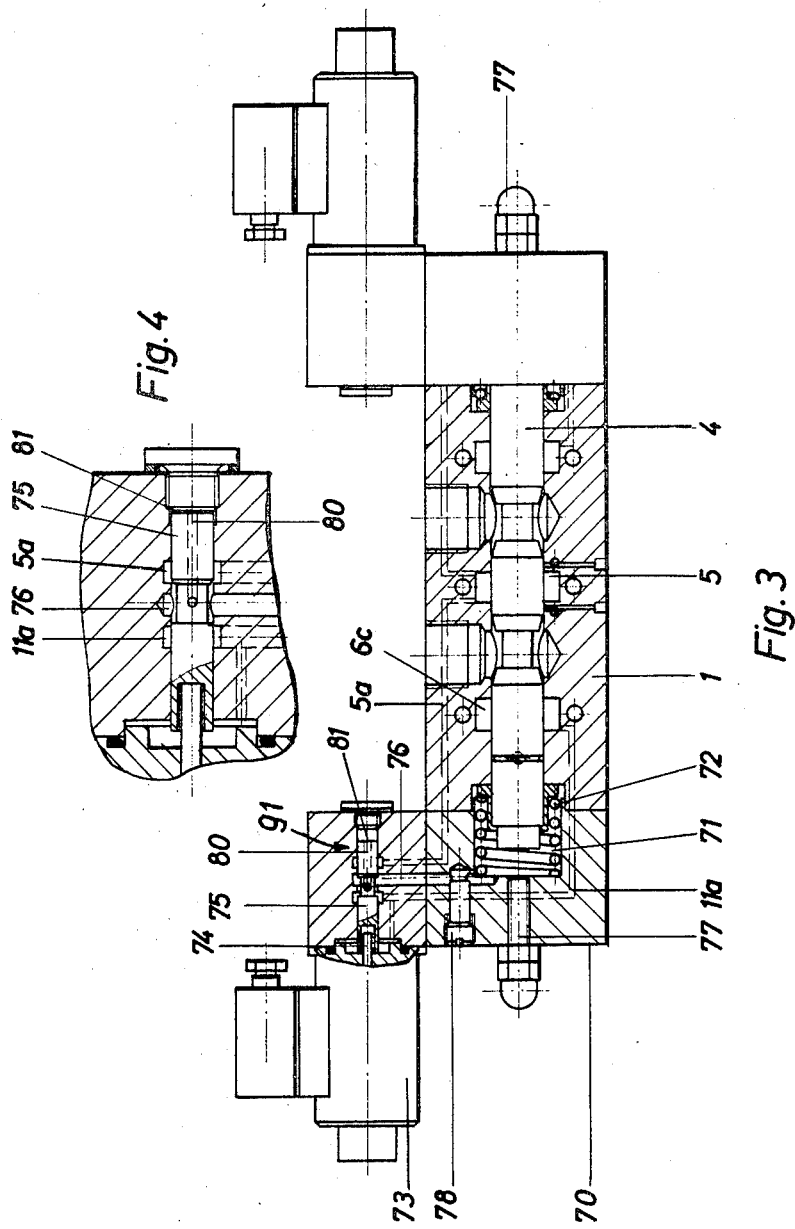

United States Patent Office 3,488,953
Patented Jan. 13, 1970

3,488,953
CONTROL APPARATUS FOR FLUID
OPERATED VEHICLES
Hubert Häussler, Friedbach, Zug, Switzerland, assignor to Beringer-Hydraulik R. Beringer & Co., Zug, Switzerland, a corporation of Switzerland
Filed Dec. 7, 1967, Ser. No. 688,819
Claims priority, application Switzerland, Dec. 13, 1966, 17,795/66
Int. Cl. F15b 15/18; F16h 41/00
U.S. Cl. 60—52                 10 Claims

ABSTRACT OF THE DISCLOSURE

A control apparatus for fluid operated, especially hydraulically operated devices, comprising means for providing a pump channel adapted to communicate with a pump, and means for providing at least one load channel adapted to communicate with a load. A slide housing and at least one slide member displaceably arranged in said slide housing serves for controlling the throughflow of fluid medium between the pump channel and the load channel, and means are provided for operating said slide member as well as there being provided connecting channel means and return flow channel means for the fluid medium. A pressure differential balancing means maintains substantially constant the pressure drop between the pump and the load, such pressure differential balancing means being operably connected in flow relationship with the aforesaid pump channel and return flow channel means and further being operably connected in flow relationship with said load channel as a function of the position of said slide member.

Background of the invention

The present invention relates to an improved control apparatus for fluid operated, especially hydraulically operated devices. The inventive control apparatus is of the type embodying at least one slide member moveable in a housing for regulating the throughflow between a pump channel and at least one consumer or load channel or conduit, as well as incorporating connecting- and return flow means for the hydraulic medium and means for actuating the aforementioned slide member.

Control mechanisms of this type are generally known to the art and have enjoyed widespread application for all possible devices or installations. Thus, for instance, they have been used for machine tools for moving the carriage or at lifting- or stacker trucks for raising and lowering a platform or the like, only to mention a few of their possible uses.

In such control mechanisms actuation of the slide member normally takes place by means of a manual lever which, for undertaking an adjustment of the "consumer or load," for instance the carriage of a machine tool, is displaced out of its central position, to thereby close a connection between a pump unit and the tank or reservoir. In so doing, the pump pressure initially increases to the maximum pressure which has been regulated at a pressure relief valve. Further axial movement of the slide member then opens a throttle location between the pump and the load, so that the stream of hydraulic medium flowing to the load, oil for instance, is determined by the pressure difference prevailing at such throttle location.

A drawback of such type construction of control device is that the pressure difference always becomes smaller with increasing load pressure, whereby also the speed of the load which is to be moved is reduced. Additionally, the pump is always operating at maximum pressure since the excess quantity of oil can only flow away through the pressure relief valve, unless the entire quantity of pumped fluid medium flows to the load or consumer. Furthermore, the effective control path at the manual lever always becomes shorter with decreasing load pressure, so that the unloaded consumer or load can only be controlled with great difficulty.

According to another known physical construction of control apparatus the throughpassage between the pump and the load is initially opened, then a throttle location between the pump and the tank or reservoir is more or less closed. Now, if the pressure which is building up exceeds the load pressure, then a portion of the pumped fluid medium flows to the load or consumer.

A drawback of this type of arrangement is that with increasing load pressure the component or branch stream which flows to the load always becomes smaller, since the pressure difference increases at the throttle location between the pump and the tank, and therefore also the component stream which flows to the tank increases. While it is true that in this instance the pump pressure only increases to the momentary load pressure, still check valves or the like are required for each control unit in order to prevent a lowering of the loaded consumer or load during the switching operation. However, what is particularly disadvantageous about such type arrangement is that the effective lever path at the manual lever always becomes shorter with increasing load pressure, so that larger loads hardly can be positively controlled.

Summary of the invention

Accordingly, it is a primary object of the present invention to provide an improved control apparatus of the mentioned type which effectively overcomes the aforementioned drawbacks of known control apparatuses for hydraulically operated devices.

Another, more specific object of the present invention relates to an improved control apparatus for fluid operated devices wherein control of a load can be carried out in a highly reliable, precise and effective manner without any undesirable shifting of the load.

Still a further significant object of the present invention relates to an improved control apparatus for fluid operated devices which is relatively simple in construction, economical to manufacture, extremely reliable in operation, not readily subject to breakdown, and capable of undertaking a desired control of a load in an extremely efficient and accurate manner.

Now, to implement these and still further objects of the invention, which will become more readily apparent as the description proceeds, the inventive control apparatus is generally characterized by the features that a so-called pressure differential balancing means is provided in order to maintain constant or substantially constant the pressure drop between the pump and the load or consumer. This pressure differential balancing means is disposed in operable flow relationship with a pump channel and return flow channel, as well as being in operable flow relationship with a load channel or conduit as a function of the position of a slide member.

By virtue of these measures it is now possible to maintain a predetermined throughflow quantity to the consumer or load constant, by automatically opening a discharge to the tank or reservoir, and specifically independently of the load pressure and a greater supply or infeed quantity.

A consequence of these measures is that the speed and work direction of the load can be regulated with greatest accuracy and precision by the means for actuating the slide member, whereby the pump pressure can be always only maintained greater than the momentarily required load pressure by a predetermined amount.

Brief description of the drawings

The invention will be better understood, and objects other than those set forth above, will become apparent, when consideration is given to the following detailed description thereof. Such description makes reference to the annexed drawings wherein:

FIGURE 1 is a cross-sectional view of an embodiment of inventive control apparatus for hydraulically operated devices;

FIGURE 2A is a cross-sectional view of the control apparatus depicted in FIGURE 1, taken along the line II–II thereof, showing the associated slide member in its neutral or null position;

FIGURE 2B is a cross-sectional view, similar to the arrangement of FIGURE 2A, but in this instance showing the slide member in its work position;

FIGURE 3 is a fragmentary view of inventive control apparatus employing an electromagnetic drive means for undertaking displacement of the slide member; and FIGURE 4 is an enlarged view showing a detail of the structure depicted in FIGURE 3.

Description of the preferred embodiments

Referring now to the drawings, and in accordance with FIGURE 1, it will be recognized that the exemplary illustrated inventive control apparatus embodies two control valves 1 and 2 as well as a so-called pressure differential balancing means or excess pressure by-pass valve means 3. These components are advantageously flanged or otherwise connected together at their respective housings 1a, 2a and 3a. Although it is absolutely sufficient in order to explain the mode of operation of the inventive control apparatus to only consider one of the control valves, such as the control valve 1 in operable association or connection with the pressure differential balancing means 3, it should be understood that the illustrated embodiment according to FIGURE 1 has been submitted for the purpose of demonstrating that it is possible to connect more than a single control valve with the pressure differential balancing means 3, for instance two or more of such control valves 1, 2, and so forth.

Each control valve 1 and 2 encompasses a slide member 4 which is axially moveable in its associated housing 1a and 2a respectively. Each such slide member 4 can be displaced out of its neutral or null-position depicted in FIGURES 1 or 2A by means of a suitable manual lever, such as the manually operable lever 90, associated with control valve 1 and schematically depicted in FIGURE 1, or by means of a suitable drive motor or electromagnetically, as will be explained later, into its work position to the left, or, as shown in FIGURE 2B, to the right, as again will be explained more fully hereinafter. Each control valve 1 and 2 is pierced by a series of flow channels, as will be considered shortly. Of these series of flow channels it will be noticed that a channel 5 is operably associated with a suitable non-illustrated pump unit to provide a pump channel. The channels 6a, 6b, and 6c, on the other hand, form a return-flow system to a non-illustrated tank or reservoir serving as a supply source for the hydraulic medium, oil for instance. Furthermore, each of both control valves 1 and 2 is provided with the channels 11 and 12 and 21 and 22 respectively, leading to a non-illustrated load or consumer. In so doing, each control valve 1, 2, and so forth, of course, acts upon its own associated load or consumer.

Both the previously mentioned pump channel 5 as well as also the return flow channel 6c communicate with or open into the pressure differential balancing means 3. The latter incorporates a control piston 31 which can be displaced, against the action of a spring member 32, towards the right in FIGURE 1.

A piston chamber or compartment 34a of the pressure differential balancing means 3, which is at the side of the spring member 32, is in operable flow connection, via a bypass control channel 35, with the return flow channel section 6b. This bypass or connecting channel 35 can be closed by the associated slide members 4 when the latter are displaced into their respective work positions. Furthermore, connecting channels 36 and 37 also open into this bypass control channel 35. These connecting channels 36 and 37, depending upon the position of the associated slide member 4, can be operably connected with the load channels 11 or 21 and 12 or 22 respectively, as such will be more fully explained hereinafter.

As will be further recognized by referring to the drawings, reduced sections or cutaway portions 41 and 42 at the slide members 4 form throttle locations which permit an operable communication or connection of the pump channel 5 with the consumer channels 11 or 12 or 21 or 22 respectively.

The previously described inventive control apparatus operates in the following manner: Now, if the slide members 4 are located in their neutral or null position depicted in FIGURE 1, and if the pump unit is switched on, then initially the stream of oil will pass from the pump channel 5 through the bores or channels 33 provided at the regulating or control piston 31 of the pressure differential balancing means 3, to arrive at the left side or face 34 of this piston member 31. This causes piston member 31 to be displaced towards the right against the action of spring member 32. Consequently, an operable flow connection is established between the pump channel 5 and the return flow channel 6c owing to the reduced or cutaway portion 31a provided at the piston member 31. As a result, the pump unit initially only operates with the pressure determined by the spring member 32. This circulating or bypass pressure can, for instance, amount to 3 atmospheres absolute pressure and remains approximately constant independent of the throughflow quantity and the number of control valves 1, 2, since the oil does not flow through the entire apparatus, rather, as already explained, is directly removed at the pressure differential balancing means 3.

Now, if work is to be performed at a load or consumer, for instance according to FIGURE 2B through the agency of the load or consumer channel 11, then the slide member 4 of the control valve 1 is displaced towards the right. During this displacement the bypass channel 35 is initially closed, and then the load conduit or channel 11 is operably connected via the channel 37 with the pressure differential balancing means 3, and specifically with the piston pressure compartment 34a at the side of the spring member 32, before there is provided an operable connection between the load channel 11 and the pump channel 5. At the same time (the other load channel 12 is connected with the return flow conduit 6a. As a result, in addition to the pressure of the spring member 32, there also acts the load pressure of the load at the end of the control piston 31 which is at the side of the spring member 32. On the other hand, at the other side or face 34 of this control piston member 31 there is effective pump pressure. Consequently, the piston member 31 is displaced towards the left, so that the discharge or drain to the tank or reservoir is closed to such an extent until the pump pressure exceeds the load pressure by 3 atmospheres absolute pressure, corresponding to the counterforce of the spring member 32. As a result, there is again established an equilibrium position at the control piston 31.

With further displacement of the slide member 4 towards the right, as shown in FIGURE 2B, there is controlled the throttle location between the pump channel 5 and the consumer or load channel 11, enabling a flow of oil in accordance with the direction of the arrows 50.

From the preceding explanation it should now be readily apparent that it is not possible for the loaded consumer or load to sink or lower, since the pump pressure is always greater than the load pressure by the aforementioned 3 atmospheres absolute pressure. Additionally, the pressure difference at the throttle location between the pump channel 5 and the load channel 11 remains constant throughout the entire control path. This pressure difference is, as already explained, independent of the load pressure as well as the greater quantity of pumped medium.

As should be readily appreciated, changes at the inclined portions of the reduced sections 41 and 42 of the slide member 4 allow for optional variable maximum throughflow quantities from the pump channel 5 to the load or consumer channels 11 and 12 or 21 and 22, respectively. This throughflow quantity can be infinitely regulated down to zero over the entire path of displacement of the associated slide member 4. Furthermore, by limiting the path of displacement of each slide member 4, for instance by means of suitable impact screws or the like, it is possible to downwardly regulate the maximum throughflow quantity to the load or consumer.

Now, if the effective load pressure in the pressure chamber 34a at the side of the spring member 32 of the control piston 31 within the pressure differential balancing means 3 exceeds the permissible maximum, then a pressure relief valve 60 becomes effective. This pressure relief valve 60 embodies a valve cone 62 which can be displaced against the action of a spring member 61, and which upon the presence of the aforementioned excess pressure opens a connecting channel 63 between the return flow channel 6c and the pressure compartment 34a. Spring 61 can be regulated by means of a threaded pin member 64 or the like. As a result, the pressure acting upon the end of the piston member 31 at the side of the spring member 32 can be maintained constant so that with a further increase of pressure in the pump channel 5 an additional force of again 3 atmospheres absolute pressure acts upon the piston side or face 34 and, thus, opens the throughflow connection between the pump channel 5 and the return flow channel 6c.

At this location it is to be mentioned that the previously described control apparatus can be also employed for controlling installations which are supplied by pressure reservoirs. To this end, there is employed in lieu of the previously described, so-called three way-quantity regulation, a two way-quantity regulation, whereby the pressure differential balancing means is effective as a pressure reduction valve unit. The pump pressure is reduced therein to an intermediate pressure which again is higher by a predetermined constant difference than the momentary load pressure.

As already previously mentioned, the displacement of the slide member 4 can either occur manually, or by a suitable drive motor or for instance by suitable electromagnetic means. An electromagnetic actuation of the slide member 4 is illustrated in the arrangement of FIGURE 3. For purposes of simplification, it should be understood that it is only necessary to describe the left side of such arrangement shown in FIGURE 3, whereby it should be understood, however, that the right side of this depicted arrangement is similarly constructed. Further, it should be understood that the electromagnetic arrangement of FIGURE 3 serves, for example, to control the displacement of the control valve 1 of FIGURES 1 and 2 for instance. Naturally, such an electromagnetic drive arrangement can be provided for each of the other control valves 2 and so forth.

Now, by referring to the exemplary illustration appearing in FIGURES 3 and 4, it will be recognized that a cap member 70 is flanged or otherwise connected to the end of the control valve 1. The confronting end of the associated slide member 4 extends into a suitable pressure compartment 71 provided at the cap member 70. Further, it will be understood that the slide member 4 is subjected to the action of a suitable spring member 72, as shown. The cap member 70 carries a servo-valve unit 91 incorporating an electromagnet 73, the armature compartment of which is sealed in pressure-tight fashion, and the armature 74 of which is moveable towards the right of the illustration appearing in FIGURE 3. The armature 74 acts upon a control piston 75 of the servo-valve unit 91. Thus, by means of the control piston 75 it is possible to control a throttle location between a pump conduit 5a and a control conduit 76 which opens into the pressure compartment 71 and to connect the control conduit 76 with a return flow conduit 11a.

Now, as shown in greater detail in FIGURE 4, the control conduit 76 operably communicates via a channel 80 provided at the control piston 75 with a pressure compartment or chamber 81 appearing at the rearward end of the control piston 75, and specifically then when the magnet 73 is in its operable position. Consequently, a force is effective at the rear of the control piston 75 which opposes the magnetic force, and which brings about a displacement of the control piston 75 until there prevails an equilibrium condition between the magnetic force and the counterforce, in that the connection between the pump conduit 5a and the control conduit 76 is throttled. As will be readily apparent, the servo-valve or valves reduce the variable pressure from the main pump conduit 5 to a constant pre-control pressure. This pressure can be additionally reduced down to zero in linear proportion to the magnet excitation current. The main control slide member 4 is displaced to such an extent by the illustrated arrangement until the pre-control pressure in the chamber 71 is in equilibrium with the spring member 72 at the opposite side. Consequently, the slide member 4 can be brought into any desired position as a function of the excitation current.

Also in this case, the maximum stroke of the slide member 4 can be adjusted in both directions by appropriate impact screws 77 or the like. This enables limiting the maximum throughflow quantity to each load or consumer, in the manner previously described.

As further depicted in FIGURE 3, it is possible to control or regulate the adjustment velocity of the main control slide member 4 by means of a positioning or adjustment screw member 78. Since the pre-control or servo-pressure remains constant, as previously explained, it is now also possible to maintain the adjusted displacement velocity or speed constant independent of the loading of the consumer or load. It is thus possible to regulate an optional acceleration or retardation for the load, which enables dispensing with any additional damping mechanisms. On the other hand, it is also possible to achieve very short actuation or switching times, since the mentioned servo-valve means does not require any return springs and operates with a relatively small stroke. As a result, the entire magnetic force is available for actuation, whereas the return positioning is undertaken by the hydraulic pressure.

As will be readily apparent by again referring to FIGURE 1, it is also possible to regulate the velocity of pressure increase and the velocity of pressure decrease during adjustment of the individual slide members 4, which can be achieved by a throttle screw member 79 provided at the pressure differential balancing means 3. This throttle screw member 79 changes the flow cross-section of the bypass control channel 35 at a location intermediate its opening into the pressure compartment 34a and the conduits 36 and 37. Regulation by means of the throttle screw member 79 enables, for instance, an accommodation of the adjustment characteristic of a load-regulated pump.

From the preceding explanation it should be apparent that it is possible to realize a so-called building block system by means of the inventive control apparatus, which enables satisfactorily coping with all control problems which may arise with the least expenditure. The numerous adjustment- and control possibilities permit an optimum accommodation of each hydraulic installation to the conditions which actually occur during operation.

While there is shown and described present preferred embodiments of the invention, it is to be distinctly understood that the invention is not limited thereto, but may be otherwise variously embodied and practiced within the scope of the following claims.

What is claimed is:

1. A control apparatus for fluid operated, especially hydraulically operated devices, comprising, in combination: means for providing a pump channel adapted to communicate with a pump, means for providing at least one load channel adapted to communicate with a load, a slide housing and at least one slide member displaceably arranged in said slide housing for controlling the throughflow of fluid medium between said pump channel and said load channel, means for operating said slide member, connecting channel means and return flow channel means for the fluid medium, a pressure differential balancing means for maintaining substantially constant the pressure drop between the pump and the load, said pressure differential balancing means being operably connected in flow relationship with said pump channel and return flow channel means and further being operably connected in flow relationship with said load channel as a function of the position of said slide member, said pressure differential balancing means incorporating a piston member and a spring member for producing the pressure differential, said piston member being displaceable against the action of said spring member, and means for operably communicating said piston member of said pressure differential means with said pump channel and said load channel in such a manner that the end of said piston member closest to said spring member is additionally subjected to the fluid medium pressure prevailing in said load channel whereas the opposite end of said piston member is subjected to the action of the fluid medium pressure prevailing in said pump channel.

2. A control apparatus as defined in claim 1 wherein said load channel and said pump channel are spaced from one another to provide therebetween at least one throttle location controlled by said slide member, said means for operably communicating said piston end closest to said spring member with said load channel includes said connecting channel means, said slide member blocking said connecting channel means when said throttle location between said load channel and associated pump channel is blocked.

3. A control apparatus as defined in claim 1, wherein said pressure differential balancing means includes means providing a pressure compartment at the region of the end of said piston member closest to said spring member, pressure relief valve means for operably communicating in flow relationship said pressure compartment with said return flow channel means.

4. A control apparatus as defined in claim 1, wherein said slide housing and said at least one slide member displaceably arranged therein forms a unitary structure with said pressure differential balancing means.

5. A control apparatus as defined in claim 1, wherein said means for operating said slide member comprises a pair of electromagnet means, each of which is operably associated with a given end of said slide member.

6. A control apparatus as defined in claim 5, further including servo-valve means provided for each end of said slide member, each servo-valve means including a control piston, each electromagnetic means being operably associated with said given end of said slide member through the agency of the associated control piston of the associated servo-valve means.

7. A control apparatus as defined in claim 6, further including means for providing a pressure compartment at each end of said slide member, means for providing a control conduit for each servo-valve means at each end of said slide member, said control conduit communicating with the associated pressure compartment, said pressure compartment communicating in flow relationship via its associated control conduit and servo-valve means both with said pump channel and said return flow channel means.

8. A control apparatus as defined in claim 7, wherein said control piston of each servo-valve means is provided with internal bore means communicating the rearward end of said control piston which is furthest from said associated electromagnet means with its associated control conduit.

9. A control apparatus for fluid operated, especially hydraulically operated devices, comprising, in combination means for providing a pump channel adapted to communicate with a pump, means for providing at least one load channel adapted to communicate with a load, a slide housing and at least one slide member displaceably arranged in said slide housing for controlling the throughflow of fluid medium between said pump channel and said load channel, means for operating said slide member, connecting channel means and return flow channel means for the fluid medium, a pressure differential balancing means for maintaining substantially constant the pressure drop between the pump and the load, said pressure differential balancing means being operably connected in flow relationship with said pump channel and return flow channel means and further being operably connected in flow relationship with said load channel as a function of the position of said slide member, said means for operating said slide member comprising pressure compartments, one at each end of said slide member housing into which the ends of said slide member, respectively, project, a servo-valve means associated with each pressure compartment, each servo-valve means including a valve body member having a port in flow communication with said pump channel, a port in flow communication with said return flow channel means, a port in flow communication with said pressure compartment via a control conduit and a control piston within said valve body member arranged on adjustment to establish flow communication either between said pump channel and said control conduit or between said control conduit and said return flow channel means, a pair of electro-magnet means, each of which is associated with a given end of said slide member through the agency of an associated piston of an associated servo-valve means, and said control piston of each servo-valve means being provided with an internal bore means communicating the rearward end of said control piston which is furthest from said associated electro-magnetic means with its associated control conduit.

10. A control apparatus for fluid operated hydraulic devices comprising a slide housing provided with a pump channel means adapted to receive fluid from a pump means, a return fluid flow channel means adapted to return fluid to said pump means, a load channel means intermediate said pump channel means and said return fluid flow channel means, a slide member provided with spaced lands in said slide housing cooperating with said channel means, said slide member being adapted to be positioned to establish fluid flow communication between said pump channel and said load channel while precluding flow from said load channel to said return fluid flow channel, or positioned to preclude flow from said pump channel to said load channel while establishing fluid flow communication between said load channel and said return fluid flow channel, said lands having inclined governing surfaces that cooperate with the walls of the channel means to effect a steady variation in the fluid flow rate through the channels upon slight adjustment of the slide member, means for operating said slide member, a pressure differential balancing means for maintaining substantially constant the pressure drop between the pump and the load, said pressure differential balancing means including a pressure operated piston valve means for controlling communication between said pump means and said return flow channel means, said piston valve means being provided with a first surface area to which pressure is supplied from said load channel means through a restricted passage means to urge the piston valve means to closed position, said piston valve means being provided with a second surface equal in area to the area of said first surface upon which pressure in said pump channel acts in a direction to open said piston valve means, said piston valve means being further biased to closed position by spring means designed to urge the piston valve to close with a predetermined force.

References Cited

UNITED STATES PATENTS

| | | | |
|---|---|---|---|
| 2,102,865 | 12/1937 | Vickers | 60—52 |
| 2,318,851 | 5/1943 | Griffith. | |
| 2,319,551 | 5/1943 | Linden et al. | |
| 2,489,435 | 11/1949 | Robinson | 60—52 XR |
| 2,527,943 | 10/1950 | Lee. | |
| 2,892,312 | 6/1959 | Allen et al. | |
| 3,162,095 | 12/1964 | Koons | 60—52 XR |
| 3,266,520 | 8/1966 | McGuire et al. | 137—596.13 |

EDGAR W. GEOGHEGAN, Primary Examiner

U.S. Cl. X.R.

91—414, 459; 137—596.13